Oct. 13, 1970  A. A. BALLMAN ET AL  3,533,755
RADIATION RESISTANT LITHIUM TANTALATE AND METHOD
OF PRODUCING SAME
Filed March 27, 1967
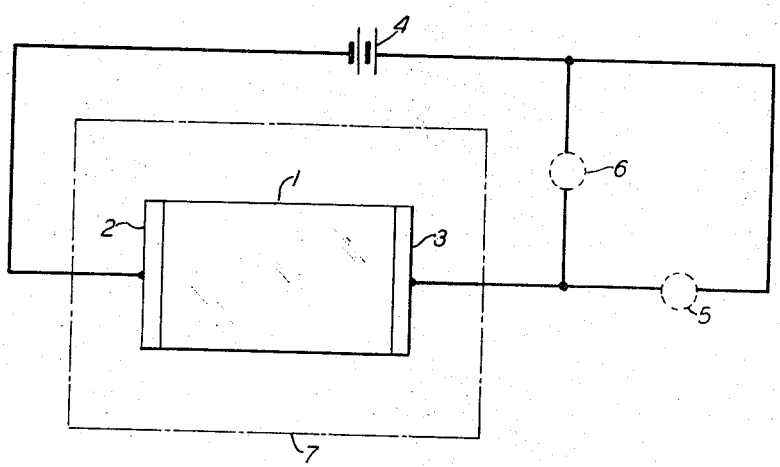
INVENTORS
A. A. BALLMAN
R. T. DENTON
H. J. LEVINSTEIN
R. G. SMITH
BY George S. Indig
ATTORNEY ര്‍
3,533,755
RADIATION RESISTANT LITHIUM TANTALATE
AND METHOD OF PRODUCING SAME
Albert A. Ballman, Woodbridge, Richard T. Denton,
South Plainfield, Hyman J. Levinstein, Berkeley Heights,
and Richard G. Smith, Summit, N.J., assignors to
Bell Telephone Laboratories, Incorporated, Berkeley
Heights, N.J., a corporation of New York
Filed Mar. 27, 1967, Ser. No. 626,063
Int. Cl. B01j 1/18; C01g 35/00
U.S. Cl. 23—293     7 Claims

ABSTRACT OF THE DISCLOSURE

Lithium tantalate ($LiTaO_3$), a linear electro-optic modulator material, is ordinarily damaged when subjected to a laser beam. Such damage, which takes the form of local inhomogeneities in index of refraction, may be avoided by electrical field treatment at elevated temperature.

BACKGROUND OF THE INVENTION

Field of the invention

The invention is concerned with material useful for the modulation of electromagnetic wave energy at frequencies including that of the visible spectrum.

Description of the prior art

One of the useful mechanisms for modulation of light involves the interaction of an applied electric field and a beam. One such material, generally utilized in its ferroelectric state, and consequently linear (degree of modulation linearly dependent upon magnitude of applied field) is lithium tantalate ($LiTaO_3$). It has been recently demonstrated that modulators utilizing this composition are capable of practical operation over a broad modulation frequency range extending up to and beyond a gigahertz [Applied Physics Letters, volume 8, page 81 (February 1966)].

It has been known for some time that the passage of light through lithium tantalate may result in refractive index inhomogeneities and resultant beam spreading. While it has been possible to select specimen portions which are not susceptible to such damage so that modulators have been operated for a long period at high power levels, the fact remains that most effective quantity production of such modulators has not been possible.

SUMMARY OF THE INVENTION

Lithium tantalate of the nominal compositional formula $LiTaO_3$ is made damage-resistant by passage of a unidirectional current through the crystal under the influence of an electric field at elevated temperature. Broadly, required electric fields are from 50 volts per centimeter to 2000 volts per centimeter. The required minimum temperature is 550° C. The time required is dependent on length and is at a minimum of the order of one-half hour per centimeter. It having been observed that resistivity of the crystal increases during the period of effective treatment, the process may be monitored by observing a diminishing current level and by stopping the procedure upon attainment of a stable value.

Resultant crystals are damage resistant at beam power levels of 50 watts per square centimeter (this is a typical modulator operating level), as well as at significantly higher levels. Since, so far as is known, natural crystal cross-sections which are damage-resistant over their entirety cannot be produced by other methods, crystals produced by the inventive methods, which are damage-resistant in their entirety, are considered to constitute an aspect of the invention.

BRIEF DESCRIPTION OF THE DRAWING

The figure is a schematic representation of a lithium tantalate crystal undergoing processing in accordance with the invention.

DETAILED DESCRIPTION

In accordance with the figure, lithium tantalate crystal 1 is provided with electrodes 2 and 3, by means of which the crystal is made part of a series circuit including D-C source 4 and, optionally, ammeter 5 and voltmeter 6. The temperature of crystal 1 is maintained at the required level by means of furnace 7.

It is known that the refractive index inhomogeneities result when the traversing beam produces field gradients normal to its transmission direction. Processing of crystals in accordance with this invention is desirably carried out under circumstances such as to minimize any such field gradients during treatment. Accordingly, electrodes 2 and 3 are desirably low resistance and desirably extend over the entirety of flat parallel opposing faces on a crystal of uniform cross-section from electrode to electrode. Suitable electrodes have been prepared by use of commercial platinum paste, which is simply painted on and dried so as to remove the temporary binder, and also have been prepared by vapor deposition of gold. Any other technique resulting in a contact resistance of 20,000 per square centimeter or below is suitable, provided the resulting electrodes are sufficiently temperature stable. Silver, for example, is unsuitable, since it flows at temperatures below the minimum of 550° C. which temperature is required during processing.

Ordinary processing of lithium tantalate for modulator use requires ferro-electric poling. Such treatment entails imposition of a field at least instantaneously at a temperature somewhat below the Curie temperature. In poling it is required that the field direction include at least a component of the crystallographic C axis. It is apparent that poling may well be carried out simultaneously with the inventive procedure. Accordingly, it is useful to apply electrodes 2 and 3 in such manner that they are normal to at least a component of the C axis. While this is, in all probability, the most expedient procedure, it should be understood that poling is a separate and distinct process and that the inventive treatment may be effectively carried out without regard to crystalline direction.

Furnace 7 is utilized to bring the specimen 1 to temperature. It has been found that a minimum temperature of 550° C. is adequate for these purposes. Temperatures substantially below this minimum may require use of voltage gradients in excess of the breakdown potential of the crystal so that arcing may result. Generally, use of higher temperatures, up to about 700° C. is expedient, in that it permits use of smaller applied fields. While still higher temperatures may be utilized and may permit use of still smaller field gradients, apparatus limitations generally dictate use of temperatures of 700° C. or lower. Further, it has been observed that there is a reaction at the negative electrode which is accelerated at higher temperature, this observed reaction again suggesting a preference for a maximum temperature of the order of 700° C. To prevent strain and possible breakage, it is desirable to bring the specimen to temperature slowly. A heating rate of about 100° C. per hour was used in an example herein without deleterious result. Limitations on this parameter, of course, depend on crystal size and strain sensitivity in the ultimate device use.

The passage of current through crystal 1 is commenced before, during, or after attainment of temperature. The range of voltage gradients considered adequate for these processes is from a minimum of 50 volts per centimeter to a maximum of 2000 volts per centimeter, with the smaller value corresponding with the higher temperature value indicated above. Neither, however, represents an absolute limit. Use of values below the minimum merely requires greater treatment time. Values significantly in excess of the indicated maximum may result in arcing but, under certain conditions and with special care, such value may be exceeded, with concomitant decrease in processing time. Generally, a preferred treatment range is from 250 volts per centimeter to 1000 volts per centimeter. The preferred minimum is chosen on the basis of treatment time; the preferred maximum merely provides for an increased safety margin below breakdown.

It has been established that the inventive procedures involve diffusion of hydrogen from one electrode to the other. The progress of this diffusant is easily traced in either of two ways. It may be determined visually, by means of a microscope, in the form of an interference fringe which has been found to move from electrode to electrode with the region of innermost hydrogen penetration. The diffusion of hydrogen and its collection at dislocation sites results, too, in an increase in resistivity, which, for constant applied voltage, manifests itself during processing in the form of a decreasing current. This current reaches a constant value when through-penetration has been achieved. This may be monitored manually or automatically.

As would be expected, treatment time is dependent upon the length of specimen between electrodes. It has been indicated that time is dependent on applied voltage, with required time decreasing as voltage increases. Under typical conditions within the preferred voltage range, indicated treatment times of the order of one-half hour per centimeter are necessary. Treatment time of the order of five hours per centimeter is, however, required at the broad minimum limit of 50 volts per centimeter.

It has been observed that crystals treated in accordance with this invention may again be rendered susceptible to radiation damages by subsequent heating in the absence of a field. Expectedly, it has been found that removal of the field before the crystal has been cooled to a temperature of 550° C. or lower may result in some damage susceptibility. Accordingly, it is preferred that the field be maintained on the crystal down to at least this temperature during cooling. Cooling is, of course, carried out at a rate sufficiently slow to prevent introduction of strain, which may be harmful, depending upon sectional size and desired application. Again, for a cube-shaped crystal of the order of a centimeter on a side, a cooling rate of the order of 100° C. per hour was found suitable.

EXAMPLE 1

A crystal grown by the Czochralski technique was grown from a stoichiometric melt prepared from 22.14 grams lithium carbonate and 133.6 grams tantalum pentoxide. A crystal 3.5 centimeters in length and 1.1 centimeters in diameter, with the longer dimension approximately corresponding with the crystallographic A axis, was prepared. A sample 1.5 centimeters long was cut normal to the C axis. Electrodes were applied to the two C faces by painting on commercial platinum paste and heating to about 100° C. to expedite removal of the volatile binder. A D-C field of 168 volts (250 volts per centimeter) was applied. The temperature of the crystal was raised by means of a resistance furnace at a rate of 100° C. per hour, to a level of 700° C. An ammeter in the circuit initially indicated a current flow of 2 ma. when the crystal had attained temperature. The conditions were maintained for a period of one hour, during which time current flow was observed to decline to a stable value of 1 ma.

The resulting crystal was removed and a randomly selected sample of dimensions .10 inch by .10 inch by .400 inch was cut, polished, and utilized in an electro-optic modulator. Such modulator was operated with a beam power of about 50 watts per cm.$^2$ for a period of 200 hours without visual evidence of damage.

EXAMPLE 2

The procedure of Example 1 was followed, using a crystal of smaller dimensions (1 cm. x .2 cm. x .2 cm.); however, with electrodes produced by vapor deposition of gold by subjecting the faces upon which the electrodes were to be produced to the vapor from a gold source heated to a temperature of above the melting point of gold for a period of about ten minutes in a vacuum chamber. The crystal was brought to a temperature of about 700° C., after which a field of 250 volts per centimeter was applied. Progress was visibly determined by following the interference fringe visually by aid of a 50 power microscope through crossed polarizers. The fringe was first observed at the positive electrode and progressed to the negative electrode during a period of about one-half hour. The heat source was shut off and the field was maintained across the crystal until the temperature of about 550° C. had been attained.

A crystalline section of one centimeter by .2 centimeter by .1 centimeter was removed from the treated crystal and was irradiated at a power density of 20,000 watts/cm.$^2$ and showed no photo-induced index inhomogeneity [Applied Physics Letters, volume 8, page 81 (February 1966)]. This was found to be equivalent to at least several months of modulator operation at a power level 50 watts/cm.$^2$.

EXAMPLE 3

The procedure of Example 1 was repeated, however, utilizing a crystal which had been grown from a melt produced from 21 grams of lithium carbonate and 97 grams of tantalum pentoxide, this representing a 6 mole percent excess of lithium oxide. The same inventive procedure was followed and the resulting section was tested at a power density of 20,000 watts/cm.$^2$.

EXAMPLE 4

The procedure of Example 1 was again repeated, however, utilizing a crystal grown from a melt containing 18.1 grams of lithium carbonate and 112.5 grams of tantalum pentoxide, representing a one mole percent deficiency of lithium oxide. Operation similar to that described in Example 1 resulted in no perceptible radiation damage.

The invention has been described in terms of a limited number of representative embodiments. The examples reproduced are but a small number of an extensive series which were utilized to define the operating parameter ranges which are set forth. Compositional variations resulting from use of the melts described in Examples 3 and 4 had no effect on the inventive treatment or its consequences. Other variations will be apparent to those skilled in the art and are considered within the scope of the appended claims.

The beneficial results of the procedures described herein have been correlated with hydrogen content which is found to migrate through the crystal under the influence of the applied field. As has been noted, such hydrogen has, in the examples set forth, resulted from decomposition of water vapor in the air atmosphere which was utilized. Other atmospheric ingredients are, of course, suitable. Variants include methane and its homologs, as well as molecular and atomic hydrogen, although it is to be recognized that either of the latter should be used in dilute quantities only with caution. Ordinary relative humidities have been found adequate, and there appears to be no necessity for regulating the amount of water vapor, or other hydrogen bearing compound, if an air atmosphere is used.

Since the inventive results have been established as due to a diffusion mechanism, it is apparent that the effective current flow is necessarily unidirectional. There is, however, no objection to including alternating components for any other reason, or to have one accidentally present as may result from an imperfectly filtered current supply.

What is claimed is:

1. Process for minimizing radiation susceptibility in a crystalline material of the nominal composition $LiTaO_3$ comprising passing direct current through said material under influence of an applied electric field of 50 to 2,000 volts per centimeter while maintaining the said material for a substantial time of the order of ½ hour per linear centimeter at an elevated temperature at a minimum of 550° C. and an upper limit so that the $LiTaO_3$ remains crystalline in an atmosphere containing a substance selected from the group consisting of hydrogen and a hydrogen bearing compound for a period sufficient to minimize such susceptibility.

2. Process of claim 1, in which the said potential is at least 250 volts per centimeter on the same basis.

3. Process of claim 2, in which the said elevated temperature is maintained until the resistivity of the said material has stopped increasing.

4. Process of claim 3, in which the said temperature is maintained until an intereference fringe is observed to progress from the positive electrode to the negative electrode.

5. Process of claim 3, in which a component of current flow occurs along the crystallographic C axis.

6. Process of claim 3, in which the said current flow is maintained until the crystal has attained a temperature of 550° C. during final cooling.

7. Crystalline material produced in accordance with the process of claim 3.

References Cited

UNITED STATES PATENTS

| | | | |
|---|---|---|---|
| 2,598,707 | 6/1952 | Matthias | 171—327 |
| 2,708,244 | 5/1955 | Jaffe | 252—62.9 X |
| 2,983,988 | 5/1961 | Hansell | 29—25.35 |
| 3,218,220 | 11/1965 | Weber | 161—1 |
| 3,449,253 | 6/1969 | Hayakawa et al. | 252—62.9 |

NORMAN YUDKOFF, Primary Examiner

R. T. FOSTER, Assistant Examiner

U.S. Cl. X.R.

29—25.35; 252—62.9